(12) United States Patent
Sturm et al.

(10) Patent No.: US 7,954,216 B2
(45) Date of Patent: Jun. 7, 2011

(54) MULTIFUNCTIONAL UNIT

(75) Inventors: Gotthilf Sturm, Glatten (DE); Achim Gauss, Dornstetten/Hallwangen (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 958 days.

(21) Appl. No.: 11/840,286

(22) Filed: Aug. 17, 2007

(65) Prior Publication Data
US 2008/0295311 A1 Dec. 4, 2008

(30) Foreign Application Priority Data

Aug. 18, 2006 (EP) .................................. 06017269

(51) Int. Cl.
*B23P 23/00* (2006.01)
(52) U.S. Cl. ................... 29/26 A; 29/50; 29/55; 408/53; 408/236; 144/35.1; 144/35.2; 144/48.1
(58) Field of Classification Search ................... 29/26 A, 29/26 B, 26 R, 35.5, 36, 39, 40, 50, 55; 408/35, 408/42, 53, 236; 409/201, 211, 216, 192, 409/203, 213, 217; 144/1.1, 35.1, 35.2, 41, 144/48.1
See application file for complete search history.

(56) References Cited

U.S. PATENT DOCUMENTS

| | | | | |
|---|---|---|---|---|
| 4,090,281 A * | 5/1978 | Hautau | ............................. | 29/40 |
| 4,349,945 A * | 9/1982 | Fox | ............................... | 29/27 A |
| 4,736,511 A * | 4/1988 | Jenkner | ........................... | 29/560 |
| 4,945,958 A * | 8/1990 | Shoda | ........................... | 29/26 A |
| 5,704,616 A * | 1/1998 | Huff et al. | ........................ | 279/62 |
| 5,720,090 A | 2/1998 | Dawson et al. | | |

FOREIGN PATENT DOCUMENTS

| | | |
|---|---|---|
| DE | 3024701 A1 | 1/1982 |
| DE | 3914008 A1 | 10/1990 |
| EP | 0 455 095 A1 | 11/1991 |
| EP | 1 099 522 A2 | 5/2001 |
| JP | 7-124907 | 5/1995 |

OTHER PUBLICATIONS

ALBERTI CNC-machining centre POLAR 3X CN printout from www.hoechsmann.com, printed on Aug. 10, 2010.*

* cited by examiner

*Primary Examiner* — Erica E Cadugan
(74) *Attorney, Agent, or Firm* — Baker Botts L.L.P.

(57) ABSTRACT

The invention relates to a multifunctional unit for machining workpieces preferably consisting at least partially of wood, wood materials, plastics or the like, with a plurality of vertical drill spindles, a plurality of horizontal drill spindles, and at least one fixed saw comprising at least one saw blade with a horizontal axis of rotation. The multifunctional unit according to the invention is characterised in that it is mounted and driven by a mounting means in such a way that it may be rotated about at least one vertical axis of rotation.

18 Claims, 3 Drawing Sheets

Prior Art

MULTIFUNCTIONAL UNIT

CROSS-REFERENCE TO RELATED APPLICATIONS

This application claims priority to European Patent Application 06017269.9, filed Aug. 18, 2006, which is incorporated by reference in its entirety herein.

FIELD OF THE INVENTION

The invention relates to a multifunctional unit for machining workpieces preferably consisting at least partially of wood, wood materials, plastics, or the like.

BACKGROUND OF THE INVENTION

Units of the type described in the introduction are used for example in the furniture and kitchen construction sector to provide carcass parts with drill holes (for example for dowels), grooves (for example for rear walls), or the like. FIG. 3 shows the structure of a unit known to the applicant in a schematic top view. The unit comprises a plurality of vertical drill spindles, a plurality of horizontal drill spindles and a saw. In this regard, the saw is integrated with a unit with four horizontal drill spindles and this unit can be rotated about a vertical axis (perpendicular to the plane of projection in FIG. 3) in order to permit horizontal drilling work and sawing work in several directions and endow the unit with sufficient flexibility.

In order in addition also to permit vertical drilling work in several directions, the unit comprises two rows of vertical drill spindles disposed orthogonally to each other. This disposal requires a high number of vertical drill spindles resulting in a complex structure and a high weight and requires a powerful drive.

There is also a commercially available "Alberti-Polar" CNC-machining centre in which a complete set of units can be rotated about 360.

SUMMARY OF THE INVENTION

It is therefore the object of the present invention to provide a unit of the type described in the introduction which has higher flexibility and a simple design.

This object is achieved by a multifunctional unit according to the present invention. Particularly advantageous further development are disclosed in the dependent claims.

The invention is based on the concept of being able to reduce the number of vertical drill spindles in the multifunctional unit without impairing the flexibility of the unit. To this end, it is provided according to the invention that the generic multifunctional unit is mounted and driven via a mounting means in such a way that it may be rotated about at least one vertical axis of rotation. In this way, it is possible in the majority of applications to dispense with a complete second row of vertical drill spindles, which greatly simplifies the design of the unit and results in a significant weight loss particularly because it is also possible to use a lighter drive for the few vertical drill spindles.

If, on the other hand, a high number of vertical drill spindles is nevertheless retained with a multifunctional unit according to the invention, the flexibility of the unit can be significantly increased since the additional vertical drill spindles do not have to be used to facilitate machining in a plurality of rotation positions, but can, for example, be equipped with other drill diameters in order to increase the range of machining options.

Although for the purposes of the present invention, the at least one saw can in principle be disposed at any location, it has been found to be advantageous for the saw to be attached to a housing of at least one of the vertical and/or horizontal drill spindles. This produces a simple and lightweight design. In this regard, it is particularly preferable for the at least one saw to share a common drive with the vertical and/or horizontal drill spindles so that it is able to dispense with an additional or separate drive for the at least one saw with corresponding advantages with respect to the design, the weight, etc.

According to a further development of the invention, it is provided that the multifunctional unit further comprises at least one interface for the attachment of at least one further machining unit. This can further increase the variability of the multifunctional unit according to the invention so that the unit can be adapted to a virtually unlimited plurality of machining types. In this regard, it is particularly preferable for the at least one interface to comprise an attachment surface and be in particular set up to supply an attached unit at least with drive power and/or energy and/or fluids and/or data. This does not have to change the configuration of the multifunctional unit in relation to the respective unit to be attached; instead the respective unit can be supplied via the interface with the required input and output variables.

The unit to be attached to the interface can be one of a plurality of different units such as those used in the field of the machining of workpieces of the type in question here. However, in combination with the other tools or units of the multifunctional unit according to the invention it has been found to be advantageous for the at least one unit to be a milling unit and/or a flush milling unit with a separating means, in particular a scraper, and/or a multispindle drill head.

For the purposes of the present invention, the vertical drill spindles can be disposed in a wide variety of configurations. For many applications, it has been found to be advantageous for the vertical drill spindles to be disposed in at least one row, for example to provide a row of holes for shelf bottoms or the like in carcass parts. In addition, however, according to a further development of the invention it is provided that at least one further vertical drill spindle is disposed, which can preferably be equipped with a drill, with a diameter deviating from that in the at least one row. This results in a high machining variety or enables tool changing times to be dispensed with.

In a similar way, according to a further development of the invention, it is provided that horizontal drill spindles are disposed in at least two directions which can preferably be fitted with drills of a different diameter.

According to a further development of the invention, it is provided that the vertical axis of rotation of the multifunctional unit is located within a housing which contains at least the vertical drill spindles or is formed by at least these. This enables the rotational range of the multifunctional unit to be minimised resulting in low space requirements and, for the majority of units, a short rotation path with correspondingly high positioning accuracy and a high-speed mode of operation. A particularly compact construction and mode of operation of the multifunctional unit according to the invention is further obtained if according to a further development of the invention the at least one saw and/or the at least one interface is located at least partially within a region which is circumscribed by the vertical drill spindles which are located furthest from the vertical axis of rotation of the multifunctional unit during a complete rotational movement of the multifunctional unit.

DETAILED DESCRIPTION

Preferred embodiments of the present invention are described in detail below with reference to the accompanying drawings.

Figure 1:
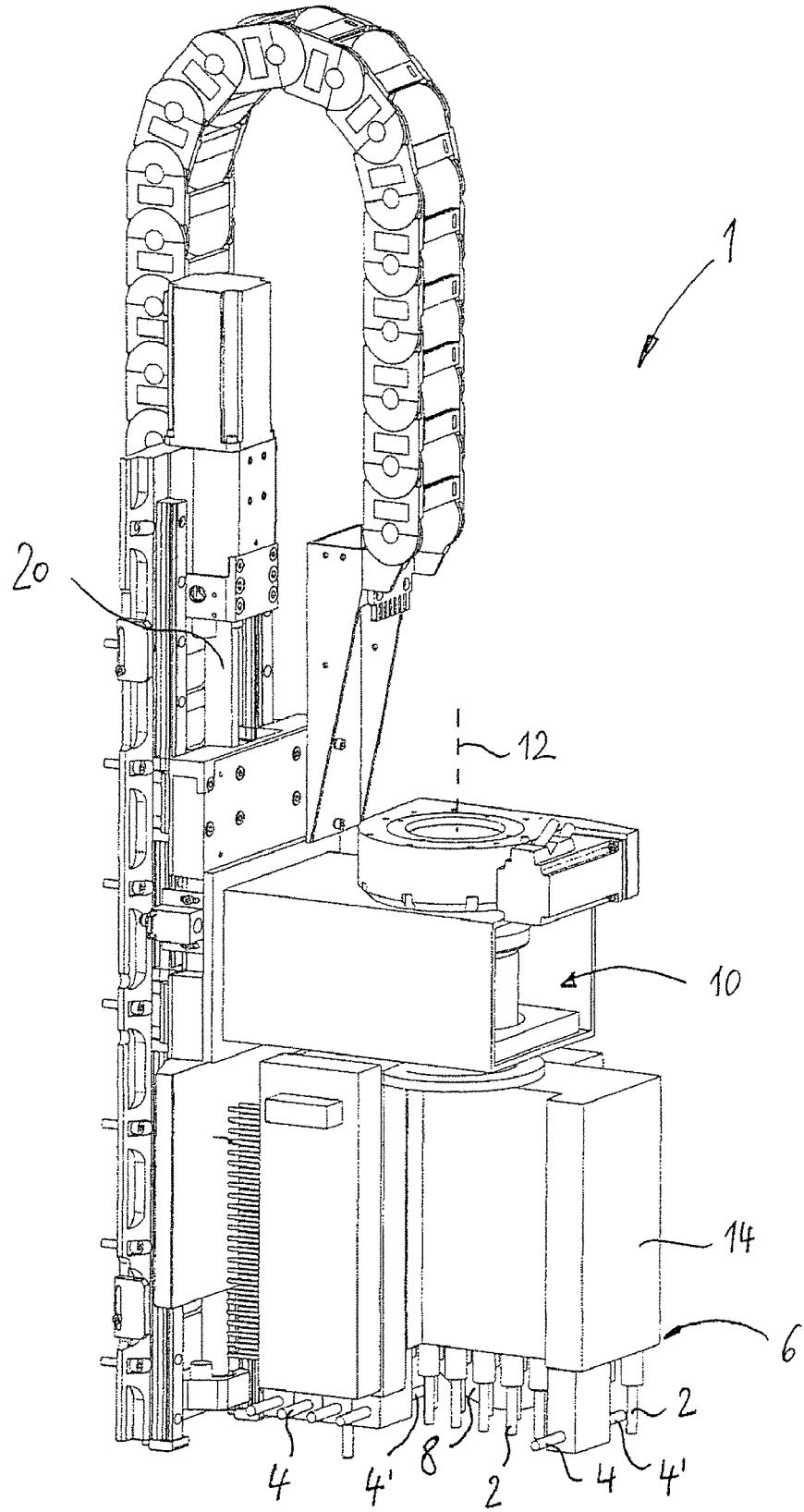
FIG. 1 is a schematic perspective view of a multifunctional unit according to the present invention.
Figure 2:
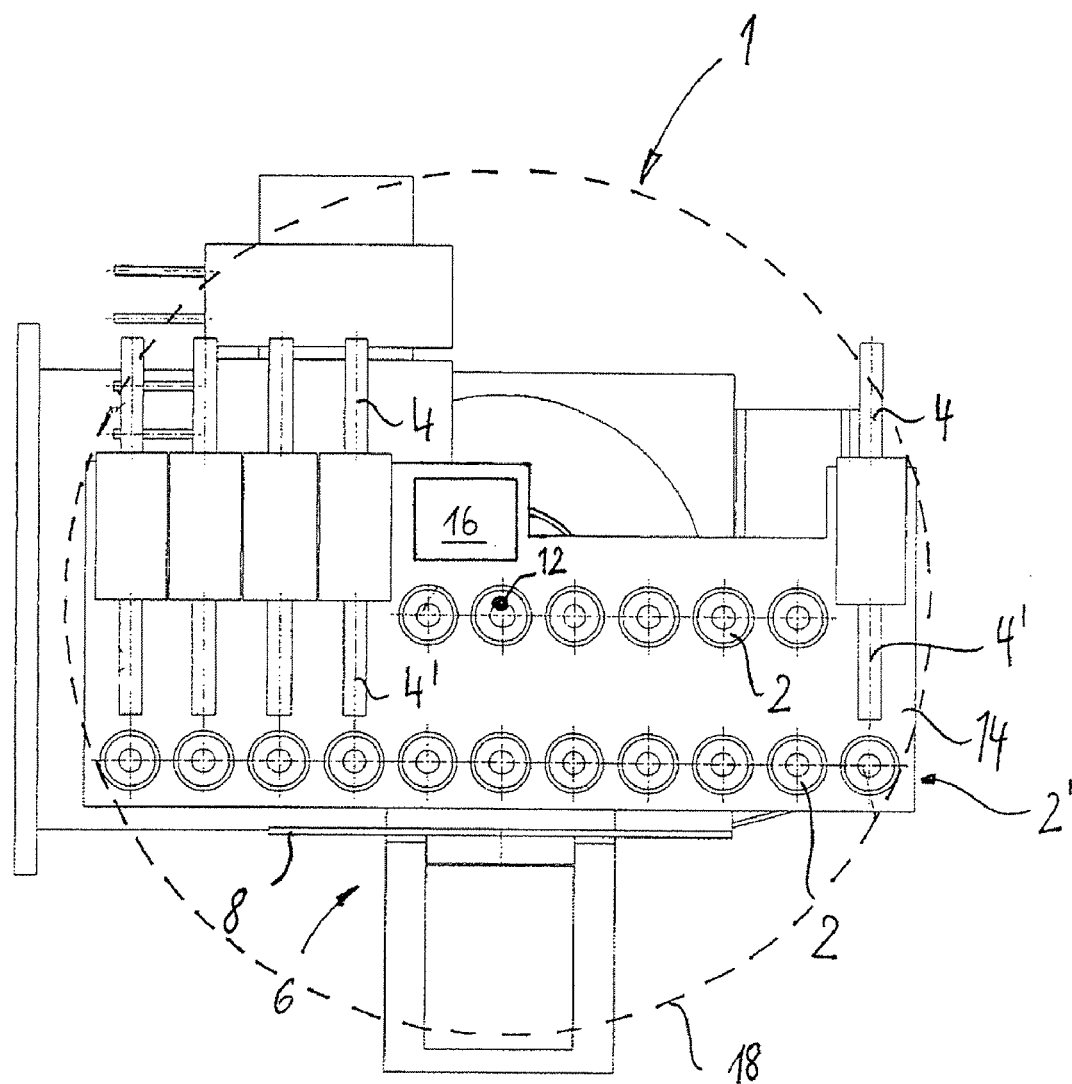
FIG. 2 is a schematic top view of the multifunctional unit shown in FIG. 1.
Figure 3:
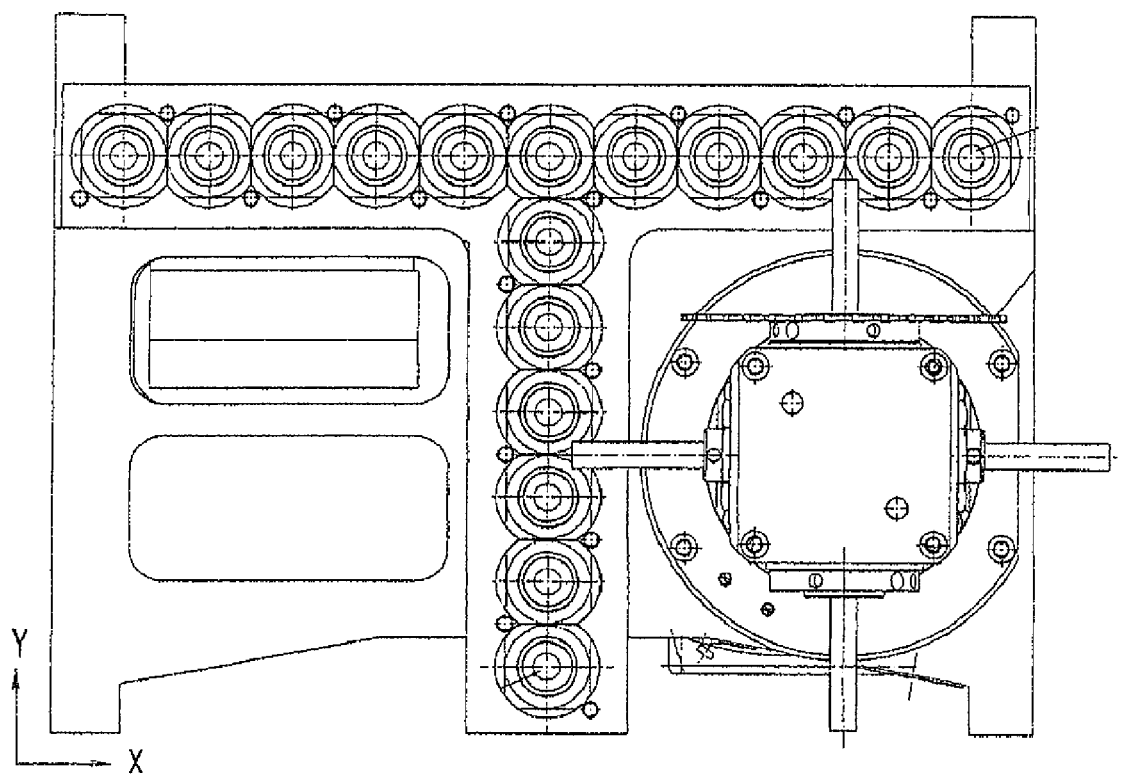
FIG. 3 is a schematic top view of a multifunctional unit known to the applicant.

A multifunctional unit 1 as a preferred embodiment of the present invention is shown in a schematic perspective view and a top view (bottom view) in FIGS. 1 and 2, respectively. The multifunctional unit can be a freestanding machine or integrated in a production line or the like and is used for machining (generally plate-shaped) workpieces, which in the present embodiment at least partially consists of wood, wood materials, plastics or the like such as those used in the furniture or kitchen construction sectors.

As is best identified in FIG. 2, in the present embodiment, the multifunctional unit comprises two rows of vertical drill spindles 2 which are substantially disposed in parallel to each other. In this regard, for example, drills with different diameters are used in the two rows. The vertical drill spindles 2 are combined in a housing 14. In addition, a plurality of horizontal drill spindles 4, 4' are disposed on the housing 14, wherein the horizontal drill spindles 4 can comprise drills with a larger diameter than those of the horizontal drill spindles 4'.

In addition, a saw 6 is attached to the housing 14 with a saw blade 8 with a substantially horizontal (i.e. lying in the projection plane of FIG. 2) axis of rotation.

The whole above-described unit is mounted and driven via a mounting means 10, which is best identified in FIG. 1 in such a way that it can be rotated about at least one vertical axis 12. This vertical axis 12 is indicated in FIG. 2 by a dot and extends through the housing 14, which is also identifiable in FIG. 1.

As is best identified in FIG. 1, the multifunctional unit may also be moved in the vertical direction by a guiding means 20. In addition, the horizontal and vertical spindles 4, 2, although not shown in the figures, can be moved via a suitable drive from a resting position into a working position so that a variety of drilling patterns can be produced.

In addition, disposed on the housing 14 there is an interface 16 which is only shown in FIG. 2 but not in FIG. 1. The interface 16 is used to attach at least one further machining unit, for example a milling unit, a flush milling unit with a separating means (for example a scraper) or a multispindle drilling head. To this end, the interface 16 comprises an attachment surface in which are disposed the connection and transmission means for drive power, energy, fluids and data although these are not shown in any more detail in FIG. 2.

A main working area 18 for the multifunctional unit according to the invention 1 is represented in FIG. 2 by a dotted circle. This region is the region which is circumscribed by the outer lying vertical spindles 2 during a rotational movement of the multifunctional unit 1 about the axis 12. This region 18 contains the essential components of the multifunctional unit according to the invention, in particular drill spindles, the interface 16 and also the essential part of the saw 6.

The invention claimed is:

1. A multifunctional unit for machining wood or plastic-containing workpieces comprising:
    a plurality of vertical drill spindles disposed in at least one row;
    a plurality of horizontal drill spindles; and
    at least one fixed saw comprising at least one saw blade with a horizontal axis of rotation, wherein the multifunctional unit is mounted and driven via a mounting means such that it may be rotated about at least one vertical axis of rotation, wherein the at least one vertical axis of rotation intersects the at least one row.

2. A multifunctional unit according to claim 1, wherein the at least one saw is attached to a housing of at least one of the vertical and/or horizontal drill spindles and has a common drive with the vertical and/or horizontal drill spindles.

3. A multifunctional unit according to claim 2, further comprising at least one interface for the attachment of at least one further machining unit.

4. A multifunctional unit according to claim 3, wherein the at least one interface comprises an attachment surface and is set up to supply an attached unit at least with drive power and/or energy and/or fluids and/or data.

5. A multifunctional unit according to claim 3, wherein the at least one further machining unit is a milling unit and/or a flush milling unit with a scraper and/or a multispindle drill head.

6. A multifunctional unit according to claim 2, wherein at least one further vertical drill spindle is provided which can be equipped with a drill with a diameter deviating from that in the at least one row.

7. A multifunctional unit according to claim 2, wherein the horizontal drill spindles are disposed in at least two directions and can be equipped with drills having different diameters.

8. A multifunctional unit according to claim 2, wherein the at least one saw is located at least partially within a region which is circumscribed by the vertical drill spindles located at the furthest distance from the at least one vertical axis of rotation of the multifunctional unit during a complete rotational movement of the multifunctional unit.

9. A multifunctional unit according to claim 1, further comprising at least one interface for the attachment of at least one further machining unit.

10. A multifunctional unit according to claim 9, wherein the at least one interface comprises an attachment surface and is set up to supply the at least one further machining unit with at least drive power and/or energy and/or fluids and/or data.

11. A multifunctional unit according to claim 10, wherein the at least one further machining unit is a milling unit and/or a flush milling unit with a scraper and/or a multispindle drill head.

12. A multifunctional unit according to claim 9, wherein the at least one further machining unit is a milling unit and/or a flush milling unit with a scraper and/or a multispindle drill head.

13. A multifunctional unit according to claim 12, wherein at least one further vertical drill spindle is provided which can be equipped with a drill with a diameter deviating from that in the at least one row.

14. A multifunctional unit according to claim 12, wherein the horizontal drill spindles are disposed in at least two directions and can be equipped with drills having different diameters.

15. A multifunctional unit according to claim 9, wherein the at least one saw and/or the at least one interface is located at least partially within a region which is circumscribed by the vertical drill spindles located at the furthest distance from the at least one vertical axis of rotation of the multifunctional unit during a complete rotational movement of the multifunctional unit.

16. A multifunctional unit according to claim 1, wherein at least one further vertical drill spindle is provided which can be equipped with a drill with a diameter deviating from that in the at least one row.

17. A multifunctional unit according to claim 1, wherein the horizontal drill spindles are disposed in at least two directions, and wherein the horizontal drill spindles can be equipped with drills having different diameters.

18. A multifunctional unit according to claim 1, wherein the at least one saw is located at least partially within a region which is circumscribed by the vertical drill spindles located at the furthest distance from the at least one vertical axis of rotation of the multifunctional unit during a complete rotational movement of the multifunctional unit.

* * * * *